(12) United States Patent
Kotsopoulos et al.

(10) Patent No.: US 11,941,227 B2
(45) Date of Patent: Mar. 26, 2024

(54) HYBRID SEARCH SYSTEM FOR CUSTOMIZABLE MEDIA

(71) Applicant: Snap Inc., Santa Monica, CA (US)

(72) Inventors: Bradley Kotsopoulos, Pickering (CA); Jiayu He, Toronto (CA)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/447,121

(22) Filed: Sep. 8, 2021

(65) Prior Publication Data

US 2023/0004260 A1    Jan. 5, 2023

Related U.S. Application Data

(60) Provisional application No. 63/217,030, filed on Jun. 30, 2021.

(51) Int. Cl.
*G06F 3/0482*    (2013.01)

(52) U.S. Cl.
CPC .................................. *G06F 3/0482* (2013.01)

(58) Field of Classification Search
CPC ....................................................... G06F 3/0482
See application file for complete search history.

(56) References Cited

U.S. PATENT DOCUMENTS

| | | | |
|---|---|---|---|
| 4,686,649 A * | 8/1987 | Rush ..................... | G06F 40/106 400/63 |
| 5,689,585 A * | 11/1997 | Bloomberg .......... | G06V 30/262 382/229 |
| 5,880,731 A | 3/1999 | Liles et al. | |
| 6,023,270 A | 2/2000 | Brush, II et al. | |
| 6,223,165 B1 | 4/2001 | Lauffer | |
| 6,772,195 B1 | 8/2004 | Hatlelid et al. | |
| 6,842,779 B1 | 1/2005 | Nishizawa | |

(Continued)

FOREIGN PATENT DOCUMENTS

| | | | | |
|---|---|---|---|---|
| CA | 2643980 A1 | * | 10/2007 | ............. G06T 11/60 |
| CN | 101765840 A | * | 6/2010 | ......... G06F 17/2288 |

(Continued)

OTHER PUBLICATIONS

U.S. Appl. No. 17/657,286, filed Mar. 30, 2022, Customizable Avatar Generation System.

(Continued)

*Primary Examiner* — Shourjo Dasgupta
(74) *Attorney, Agent, or Firm* — SCHWEGMAN LUNDBERG & WOESSNER, P.A.

(57) ABSTRACT

The technical problem of reducing the amount of processing involved when searching for customizable media content items that are suitable for incorporating input text is addressed by providing a hybrid search system. In some examples, the hybrid search system executes a rough search first, to determine whether a line of text can be incorporated into a media content item, based on character count conditions associated with the media content item. A more thorough evaluation of the input text with respect to the media content item is executed subsequent to the rough search if the rough search produces a result indicating uncertainty with respect to whether the combination of specific characters included in the input text can or cannot be incorporated into the media content item.

20 Claims, 11 Drawing Sheets

(56) References Cited

U.S. PATENT DOCUMENTS

| | | | |
|---|---|---|---|
| 7,212,309 B1* | 5/2007 | Sellers | G06F 3/1208 |
| | | | 358/1.18 |
| 7,342,587 B2 | 3/2008 | Danzig et al. | |
| 7,468,729 B1 | 12/2008 | Levinson | |
| 7,555,717 B2 | 6/2009 | Seo et al. | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,572,203 B1* | 10/2013 | Kossow | H04L 51/06 |
| | | | 709/200 |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,152,979 B2 | 10/2015 | Tew et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,456,170 B1* | 9/2016 | Miller | G11B 27/10 |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,639,969 B1 | 5/2017 | Wilson et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,881,403 B2 | 1/2018 | Tyson et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,049,477 B1 | 8/2018 | Kokemohr et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,169,897 B1* | 1/2019 | Geiger | A63F 13/63 |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,270,983 B1 | 4/2019 | Van Os et al. | |
| 10,360,708 B2 | 7/2019 | Bondich et al. | |
| 10,362,219 B2 | 7/2019 | Wilson et al. | |
| 10,444,938 B1 | 10/2019 | Bhalerao et al. | |
| 10,454,857 B1* | 10/2019 | Blackstock | H04L 51/52 |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,607,065 B2 | 3/2020 | Milman et al. | |
| 10,657,701 B2 | 5/2020 | Osman et al. | |
| 10,659,405 B1 | 5/2020 | Chang et al. | |
| 10,990,246 B1 | 4/2021 | Law et al. | |
| 11,307,732 B1* | 4/2022 | Bischoff | G06F 3/04847 |
| 11,308,674 B2 | 4/2022 | Xu et al. | |
| 11,361,521 B2 | 6/2022 | Lee et al. | |
| 11,380,077 B2 | 7/2022 | Scapel et al. | |
| 2001/0049596 A1 | 12/2001 | Lavine et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0008177 A1* | 1/2006 | Chermont | G06T 11/60 |
| | | | 358/1.9 |
| 2006/0217979 A1 | 9/2006 | Pahud et al. | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2010/0313107 A1* | 12/2010 | Hikida | G06F 40/106 |
| | | | 715/202 |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2011/0239143 A1 | 9/2011 | Ye et al. | |
| 2011/0296324 A1 | 12/2011 | Goossens et al. | |

(56) References Cited

U.S. PATENT DOCUMENTS

| | | | |
|---|---|---|---|
| 2011/0313756 A1* | 12/2011 | Connor | G06F 40/253 |
| | | | 704/9 |
| 2012/0092435 A1 | 4/2012 | Wohlert | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2013/0298084 A1* | 11/2013 | Spivack | H04L 65/403 |
| | | | 705/14.67 |
| 2013/0332850 A1* | 12/2013 | Bovet | G06F 3/0482 |
| | | | 715/752 |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0306989 A1* | 10/2014 | Doubleday | G06Q 30/0272 |
| | | | 345/629 |
| 2015/0172246 A1 | 6/2015 | Velummylum et al. | |
| 2015/0206349 A1 | 7/2015 | Rosenthal et al. | |
| 2016/0134840 A1 | 5/2016 | Mcculloch | |
| 2016/0139761 A1* | 5/2016 | Grosz | H04N 1/00145 |
| | | | 715/769 |
| 2016/0234149 A1 | 8/2016 | Tsuda et al. | |
| 2017/0046065 A1 | 2/2017 | Zeng et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Dusen et al. | |
| 2017/0310934 A1 | 10/2017 | Du et al. | |
| 2017/0312634 A1 | 11/2017 | Ledoux et al. | |
| 2018/0005420 A1 | 1/2018 | Bondich et al. | |
| 2018/0025219 A1 | 1/2018 | Baldwin et al. | |
| 2018/0026925 A1 | 1/2018 | Kennedy | |
| 2018/0047200 A1 | 2/2018 | O'hara et al. | |
| 2018/0077095 A1 | 3/2018 | Deyle et al. | |
| 2018/0091732 A1 | 3/2018 | Wilson et al. | |
| 2018/0113587 A1 | 4/2018 | Allen et al. | |
| 2018/0115503 A1 | 4/2018 | Baldwin et al. | |
| 2018/0249200 A1 | 8/2018 | Wang et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0069007 A1* | 2/2019 | Bodas | H04N 19/44 |
| 2019/0122411 A1 | 4/2019 | Sachs et al. | |
| 2019/0158735 A1 | 5/2019 | Wilson et al. | |
| 2019/0188920 A1 | 6/2019 | Mcphee et al. | |
| 2019/0250934 A1 | 8/2019 | Kim et al. | |
| 2019/0287287 A1 | 9/2019 | Bondich et al. | |
| 2019/0339847 A1 | 11/2019 | Scapel et al. | |
| 2020/0004829 A1 | 1/2020 | Denton et al. | |
| 2020/0034033 A1 | 1/2020 | Chaudhri et al. | |
| 2020/0272306 A1 | 8/2020 | Barkman et al. | |
| 2020/0409533 A1 | 12/2020 | Blackstock et al. | |
| 2021/0042978 A1 | 2/2021 | Zheng | |
| 2021/0126883 A1 | 4/2021 | Choi et al. | |
| 2021/0176197 A1 | 6/2021 | Al Majid et al. | |
| 2021/0216203 A1 | 7/2021 | Wu et al. | |
| 2021/0232632 A1 | 7/2021 | Howard | |
| 2021/0343030 A1* | 11/2021 | Sagonas | G06T 7/30 |
| 2021/0375023 A1 | 12/2021 | Kothari et al. | |
| 2022/0070385 A1 | 3/2022 | Van Os et al. | |
| 2022/0319075 A1 | 10/2022 | Hu et al. | |
| 2022/0319078 A1 | 10/2022 | Kozakov et al. | |
| 2023/0215083 A1 | 7/2023 | Hoffman-John et al. | |
| 2023/0281940 A1 | 9/2023 | Shen | |

FOREIGN PATENT DOCUMENTS

| | | | | |
|---|---|---|---|---|
| CN | 109863532 A | 6/2019 | | |
| CN | 110168478 A | 8/2019 | | |
| EP | 1549031 | 6/2005 | | |
| EP | 2184092 A2 | 5/2010 | | |
| JP | H07137377 A * | 5/1995 | | |
| JP | 2001230801 A | 8/2001 | | |
| JP | 2005216181 A * | 8/2005 | | |
| JP | 2008090449 A * | 4/2008 | | |
| JP | 5497931 B2 | 3/2014 | | |
| KR | 20060048736 A * | 5/2006 | ........... | G06F 3/0482 |
| KR | 101445263 B1 | 9/2014 | | |
| WO | WO-2003094072 A1 | 11/2003 | | |
| WO | WO-2004095308 A1 | 11/2004 | | |
| WO | WO-2006107182 A1 | 10/2006 | | |
| WO | WO-2007134402 A1 | 11/2007 | | |
| WO | WO-2012116241 A2 * | 8/2012 | ............. | G06F 15/16 |
| WO | WO-2012139276 A1 | 10/2012 | | |
| WO | WO-2013027893 A1 | 2/2013 | | |
| WO | WO-2013152454 A1 | 10/2013 | | |
| WO | WO-2013166588 A1 | 11/2013 | | |
| WO | WO-2014031899 A1 | 2/2014 | | |
| WO | WO-2014194439 A1 | 12/2014 | | |
| WO | WO-2016090605 A1 | 6/2016 | | |
| WO | WO-2018081013 A1 | 5/2018 | | |
| WO | WO-2018102562 A1 | 6/2018 | | |
| WO | WO-2018129531 A1 | 7/2018 | | |
| WO | WO-2019089613 A1 | 5/2019 | | |
| WO | 2022213088 | 10/2022 | | |

OTHER PUBLICATIONS

"U.S. Appl. No. 17/303,357, Response filed Jun. 15, 22 to Final Office Action dated Mar. 15, 2022", 9 pgs.

"International Application Serial No. PCT US2022 071441, International Search Report dated Jul. 4, 2022", 5 pgs.

"International Application Serial No. PCT US2022 071441, Written Opinion dated Jul. 4, 2022", 10 pgs.

"U.S. Appl. No. 17/303,357, Non Final Office Action dated Jul. 26, 2022", 18 pgs.

Gupta, Tanmay, "Imagine This! Scripts to Compositions to Videos", In: "Pattern Recognition: 5th Asian Conference, ACPR2019, Auckland, New Zealand, Springer Selected Papers, Part II", Springer International Publishing, Cham, [Online] Retrieved from the internet:https: arxiv.org pdf 1804.03608.pdf, (Nov. 26-29, 2019), 22 pgs.

Jin, Hou, "Humanoid Personalized Avatar Through Multiple Natural Language Processing", [Online] Retrieved from the internet:http: citeseerx.ist.psu.edu viewdoc download?doi=10.1.1.353.879andrep=rep1andtype=pdf, (Nov. 20, 2009), 6 pgs.

"U.S. Appl. No. 17/303,357 Response Filed Jan. 13, 22 to Non Final Office Action dated Oct. 13, 2021,", 10 pgs.

"U.S. Appl. No. 17/303,357, Final Office Action dated Mar. 15, 2022", 16 pgs.

"U.S. Appl. No. 17/303,357, Non Final Office Action dated Oct. 13, 2021", 13 pgs.

"Bitmoji Customize text", (Feb. 25, 2021), 4 pgs.

"Bitmoji Chrome Extension", (Sep. 19, 2020), 5 pgs.

"U.S. Appl. No. 17/303,357, Response filed Oct. 26, 2022 to Non Final Office Action dated Jul. 26, 2022", 10 pgs.

"International Application Serial No. PCT US2022 073265, International Search Report dated Oct. 26, 2022", 4 pgs.

"International Application Serial No. PCT US2022 073265, Written Opinion dated Oct. 26, 2022", 7 pgs.

"U.S. Appl. No. 17/657,286, Non Final Office Action dated Sep. 27, 2023", 27 pgs.

"International Application Serial No. PCT/US2022/071441, International Preliminary Trport on Patentability dated Oct. 12, 2023", 12 pgs.

Bitmoji, "Customize Text on Bitmoji Stickers", [Online]. Retrieved from the Internet: https://erb.archive.Org/web/20200926160053/ https://support.bitmoji.com/hc/en-us/articles/360034632291>, (Sep. 26, 2020), 4 pgs.

(56) References Cited

OTHER PUBLICATIONS

Bitmoji, "Customize your Bitmoji text on the Bitmoji Chrome Extension", [Online], Retrieved from the Internet: <https://www.youtube.com/watch?v=pIXHVwGPuYA>, (Oct. 16, 2019), 2 pgs.

* cited by examiner

HYBRID SEARCH SYSTEM FOR CUSTOMIZABLE MEDIA

CLAIM OF PRIORITY

This application claims the benefit of priority to U.S. Provisional Application Ser. No. 63/217,030, filed Jun. 30, 2021, which is incorporated herein by reference in its entirety.

TECHNICAL FIELD

The present disclosure relates generally to creating and manipulating digital content.

BACKGROUND

As the popularity of mobile based social networking systems continues to grow, users increasingly share media content items, such as electronic images, animations, or videos with each other. These media content items are typically uniquely personalized, and thus, reflect a demand to encourage electronic visual communication on a global scale.

Social networking systems comprise millions of users. Each user in a social networking system can transmit media content items between members of his or her individual social networking profile or to individuals outside of the social networking profile.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
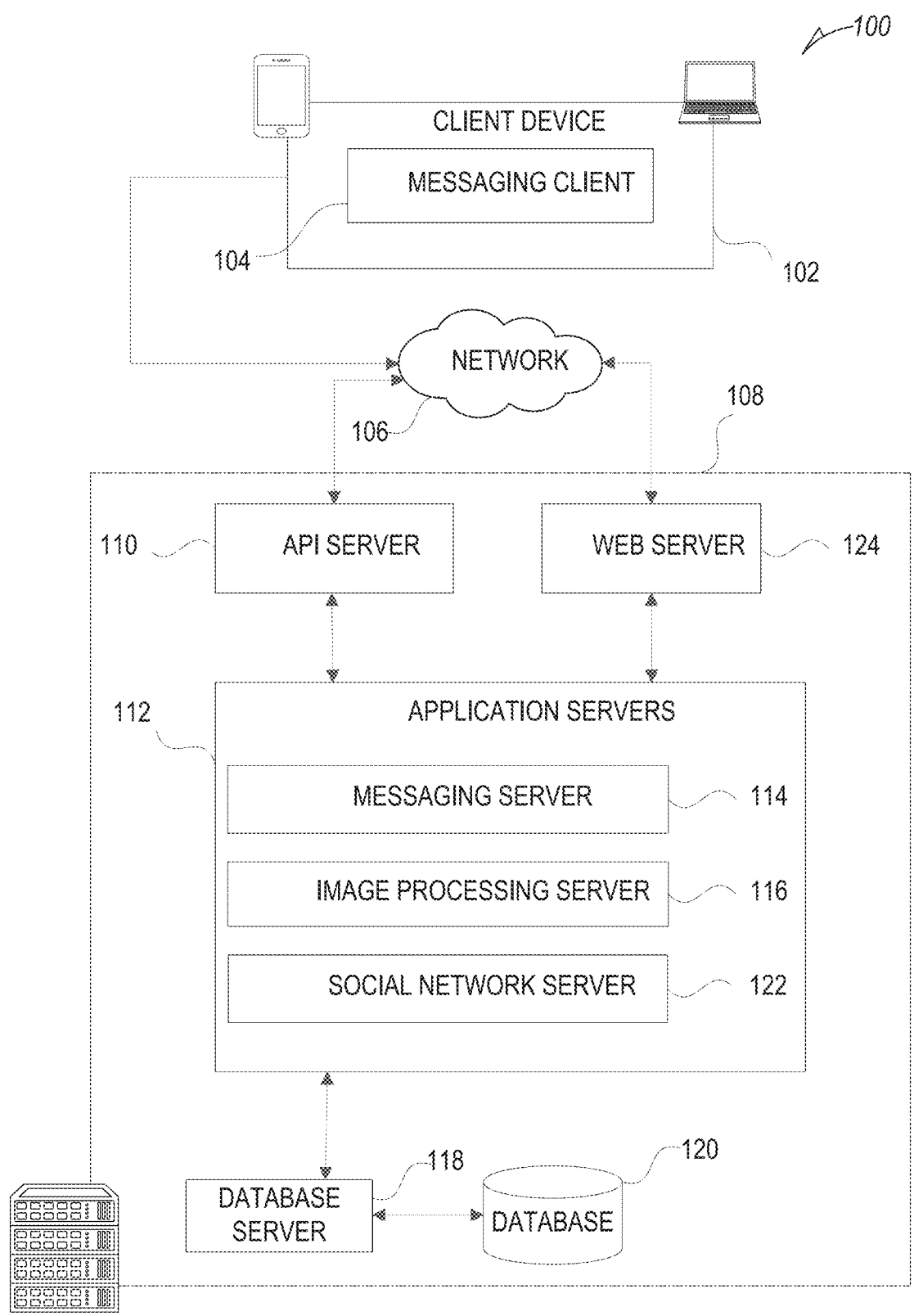
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In social networking systems, such as a messaging system, digital representations of respective users, known as avatars, can be rendered in two-dimensional or three dimensional form and can be integrated into virtual gaming, messaging systems, or interactive software applications. The avatars are designed on the back-end of the messaging system and are stored in an image database. An avatar can be made accessible by the messaging system, for individual user configurations, e.g., for adding features, text, or the like.

In one example, the messaging system provides avatars configured to incorporate textual phrases and to permit a user to personalize an avatar by specifying the text to be incorporated into the presentation of the avatar. Avatars that can be personalized by specifying the text to be incorporated into an avatar are referred to as customizable avatars, for the purposes of this description. An avatar that has been configured to incorporate text provided by a user is referred to as a personalized avatar. A personalized avatar that integrates user-provided input, such as letters, words, phrases, and expressions, can be overlaid on top of media content items (such as photos or videos), can be included in chat messages, can be stored for future use, and so on.

Depending on the text characteristics of a given avatar (such as the size of a text placeholder associated with an avatar, for example), not every avatar may be suitable for the input text provided by a user. For example, if the text characteristics of an avatar indicate that the avatar can incorporate no more than a single line or text that is no longer than 5 characters, the text input spelling "FAREWELL!" would not be considered a match with respect to that avatar. On the other hand, if an avatar is configured such that it can incorporate three lines of text, up to 5 character each, the text input spelling "FARE THEE WELL!" and the text characteristics of the avatar would be considered a match, because the text input can be incorporated into the three lines of text in the avatar as "FARE" and "THEE" and "WELL!" The messaging system can be configured to detect text input provided by a user and identify customizable avatars that are suitable for incorporating the text input.

The technical problem of reducing the amount of processing involved when searching for customizable avatars that are suitable for incorporating the text input provided by a user, while maintaining a good recall and precision rate, is addressed by providing a hybrid search system described herein.

In some examples, the hybrid search system executes a rough search first to determine, with respect to each customizable avatar, whether it is fit for incorporating the input text entered by a user, whether it is unfit for incorporating the text entered by a user, or if it is uncertain whether it is fit or unfit for incorporating the text entered by a user. The rough search is based on comparing the character count in the input text to the thresholds stored as associated with individual avatars. A more thorough search is executed subsequent to the rough search, only with respect to those customizable avatars, for which the rough search did not produce a definitive indication of whether the text entered by a user can or cannot be incorporated into the avatar.

In order to implement a hybrid search methodology, the hybrid search system associates each customizable avatar with a set of parameters, referred to as character count conditions (CCCs) for the purposes of this description. The CCCs include a minimum threshold, an uncertain threshold, and a maximum threshold. The minimum threshold indicates the minimum number of characters that can be incorporated into a line of text in the customizable avatar. For example, a customizable avatar may be configured to require that the line of text cannot be empty or that the line should include at least two characters. The uncertain threshold indicates the maximum number of characters that can be presented as a line of text, if the line is completely filled with the largest character (for example, "W"). The maximum threshold indicates the maximum number of characters that can be included in a line of text, if the line is completely filled with the smallest character (for example, "i"). If the character count in the text entered by a user is less than or equal to the maximum number of largest characters (the uncertain threshold), it is certain that the text can be incorporated in the associated line in the customizable avatar. If the character count in the text entered by a user is greater than the maximum number of smallest characters (the maximum threshold), it is certain that the text cannot be incorporated in the associated line in the customizable avatar. A customizable avatar is stored as associated with a data structure, which includes the identifier for the avatar, a value indicating the number of lines of text that can be incorporated into the avatar, and respective CCCs associated with each line.

The process performed by the hybrid search system may be described as follows. The system detects user input in the form of text. The detected input text is then used to generate split options that include various combinations of parts of the text input separated into one or more lines. For example, the input text "Be My Valentine" may be split into the following four split options, as shown in Example 1 below.

Example 1

Option (1) "Be My Valentine"
Option (2) "Be My" and "Valentine"
Option (3) "Be" and "My Valentine"
Option (4) "Be" and "My" and "Valentine"

With respect to each split option, the hybrid search system performs a rough search to identify each customizable avatar as fit, unfit, or uncertain, based on their CCCs. Using the split options shown in Example 1, the rough search may identify, as fit with respect to split option (4), an avatar configured to incorporate three lines of text, the first line CCCs being (1, 2, 4), the second line CCCs being (1, 4, 6), the third line CCCs being (1, 10, 12). Such avatar can be personalized to include "Be" in the first line, "My" in the second line, and "Valentine" in the third line. The rough search may identify, as unfit with respect to the split option (4), an avatar that has less than three lines or where the avatar has three lines, but where the maximum threshold for each line is 7, which is less than the number of characters in the word "Valentine." The rough search may identify, as uncertain with respect to the split option (4), an avatar that has three lines, the first line CCCs being (1, 2, 3), the second line CCCs being (1, 4, 5), the third line CCCs being (1, 8, 9). In this case, the uncertain and maximum thresholds for the third line being 8 and 9 respectively, and the third word in the split option (4) having 9 characters, the word may or may not fit in line 3 of the text placeholder, depending on the specific combination of characters in that word, because some characters may be wider, and some may be narrower than others.

The outcomes of the rough search can be characterized in terms of the respective split options being fit, unfit, or uncertain with respect to a given customizable avatar. If, based on the rough search, at least one of the split options generated for the input text has been identified as fit with respect to a given avatar, the avatar is personalized by incorporating the input text in the form of that split option and presented on a display device as a selection choice for the user. If, based on the rough search, all of the split options generated for the input text has been identified as unfit with respect to a given avatar, the avatar is no longer regarded as a candidate for personalization with the input text. If, based on the rough search, none of the split options generated for the input text have been identified as fit with respect to a given avatar, and at least one of the split options generated for the input text has been identified as uncertain with respect to the given avatar, the hybrid search system may proceed with a thorough search, which involves computationally more expensive text-based logic, to determine whether the split option can be recharacterized as fit for being incorporated into the given avatar. In some examples, the text-based logic may entail evaluating respective glyph characteristics of individual characters in the one or more lines in the uncertain split option. The glyph characteristics include one or more of the font type, size, dimensions, kerning, and shape of each individual character in a line of text.

If, based on the thorough search, the split option has been recharacterized as fit for being incorporated into the given avatar, the avatar is personalized by incorporating the input text in the form of that split option and presented on a display device as a selection choice for the user.

When a user selects one of the personalized avatars presented on a display device, the messaging system detects the selection and, in response, includes the selected personalized avatar into a context user interface, such as, for example, a chat messaging user interface (that permits users to create, send, and receive messages over a network), an image editing user interface (that permits users to edit previously captured images), and so on.

It will be noted that while the methodologies are described herein with respect to customizable avatars, these methodologies can be used beneficially with respect to any media content items that can be associated with character count conditions and configured to incorporate text data provided by a user.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using a viewfinder ring flash. Data exchanges within the messaging system 100 are invoked and controlled through functions available via user interfaces (UIs) of the messaging client 104. For example, the messaging client 104 can present a camera view UI that displays the output of a digital image sensor of a camera provided with the client device 102, a chat messaging UI that permits users to create, send, and receive messages over a network, an image editing user interface that permits users to edit images (such as, for example images previously captured using the camera view UI), and so on.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. In some examples, a collection may include an item that has an overlayed personalized media content item, such as, for example, a personalized avatar that includes text corresponding to text input provided by a user. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116. In some examples, an image processing server 116 is configured to provide the functionality of the hybrid search system described herein, which facilitates reducing the amount of processing involved when searching for customizable media content items that are suitable for incorporating the text input provided by a user, while maintaining a good recall and precision rate.

Figure 3:
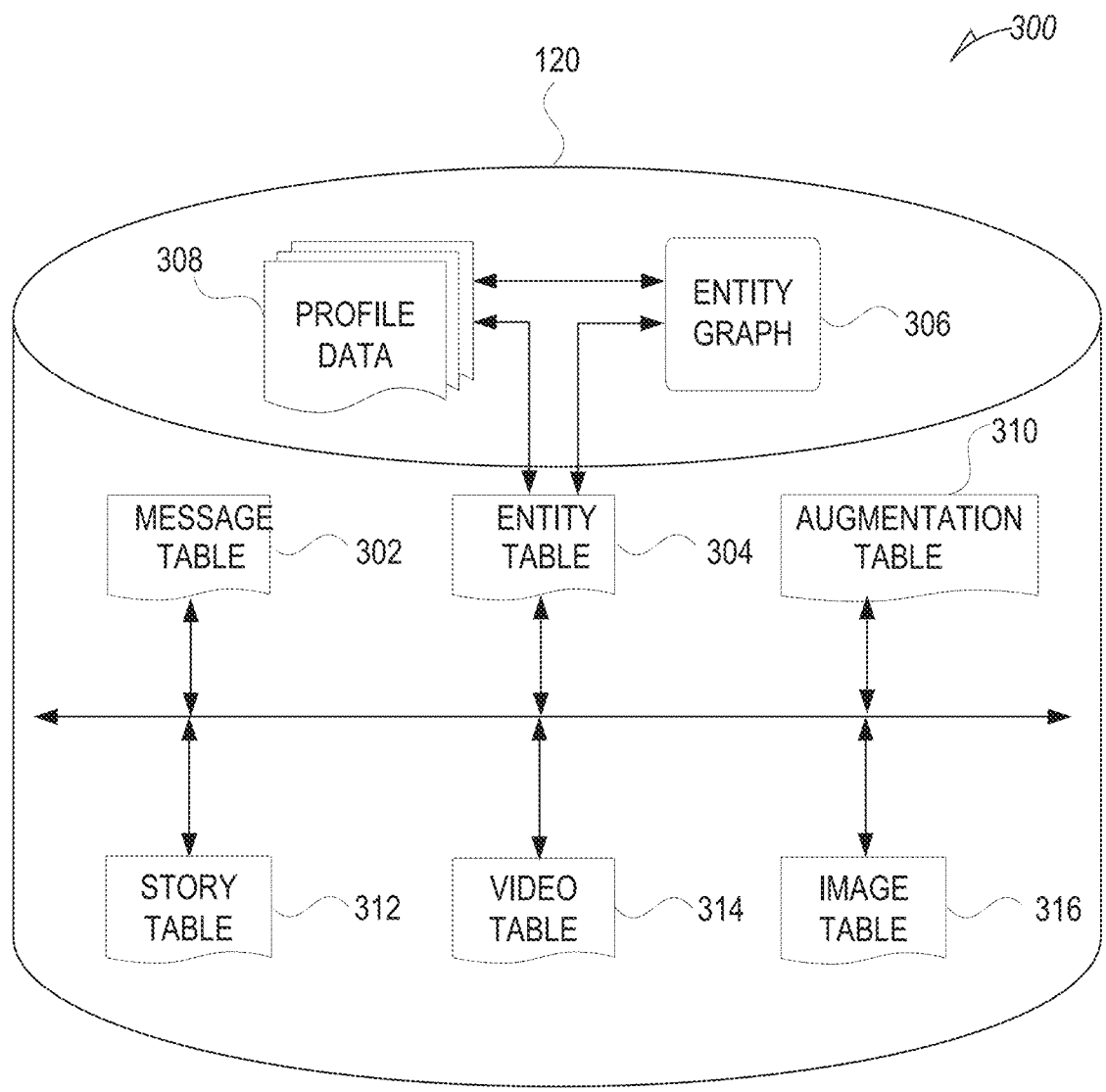
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user.

System Architecture

Figure 2:
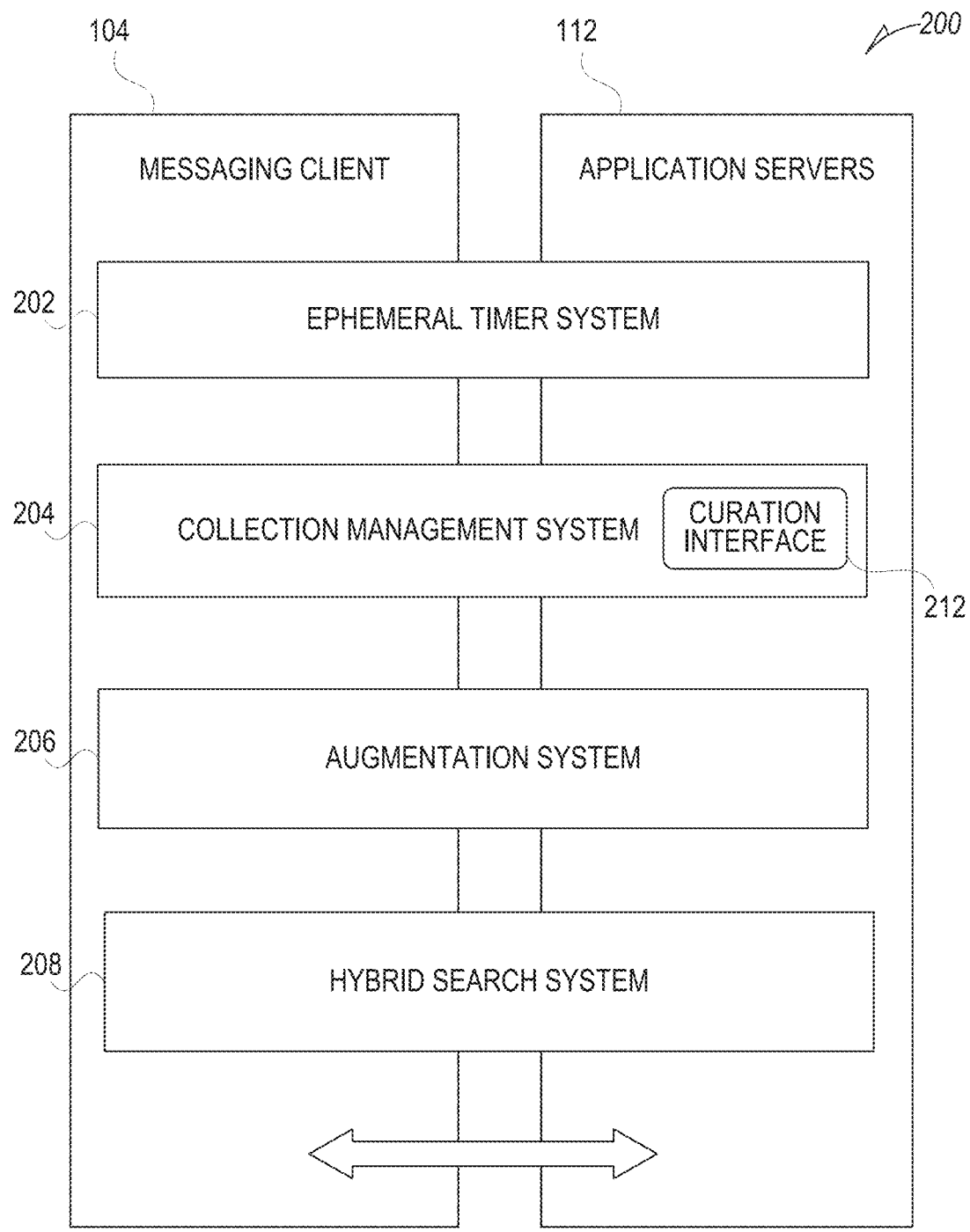
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104, and on the sever-side by the application servers 112. These subsystems include, for example, an ephemeral timer system 202, a collection management system 204, an augmentation system 206, and a hybrid search system 208.

The hybrid search system 208 is configured to identify customizable media content items that can be personalized by incorporating text input provided by a user, as described herein.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using one or more AR components. In some examples, a media content item in a collection includes overlayed augmentation data in the form of a personalized media content item, such as a personalized avatar. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying.

The audio and visual content or the visual effects can be applied to a media content item (e.g., a photo) at the client device 102. For example, a media overlay may include text or image that can be overlaid on top of a photograph taken by the client device 102 or included in a message sent from the messaging client executing of one client device to the messaging client executing on another client device. A media overlay may be configured to incorporate custom text provided by a user and can be identified as fit or unfit for incorporation of the input text using the methodologies described herein with respect to the hybrid search system.

In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 126 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using a viewfinder ring flash. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using a viewfinder ring flash.

As mentioned above, the video table 314 stores video data that, in one example, is associated with messages for which records are maintained within the message table 302. Similarly, the image table 316 stores image data, which may be associated with messages for which message data is stored in the entity table 304. In some examples, the image table 316 stores customizable overlays, such as, for example, customizable avatars. The entity table 304 may associate various augmentations from the augmentation table 310 with various images and videos stored in the image table 316 and the video table 314.

Data Communications Architecture

Figure 4:
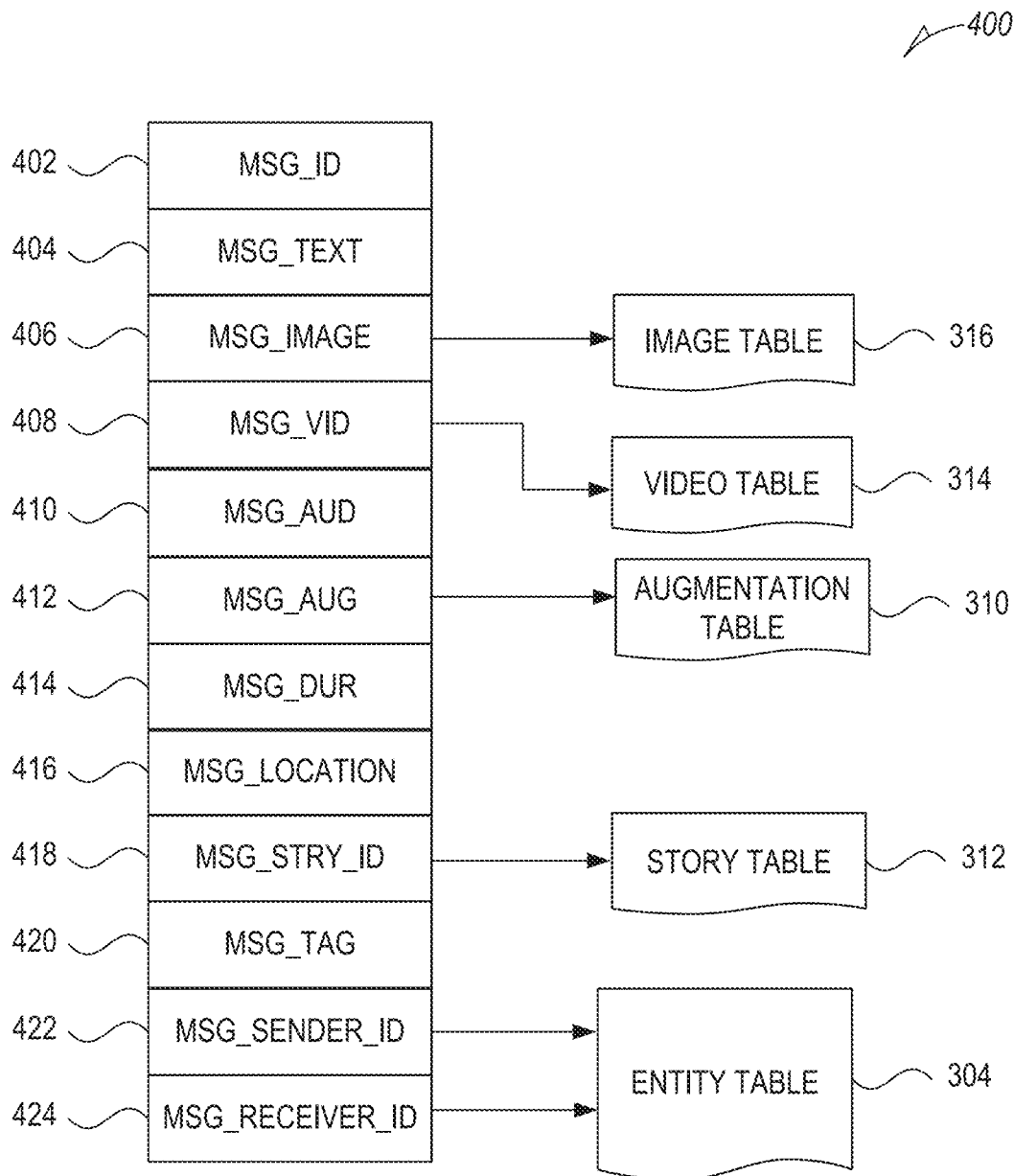
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316. In some examples, the image data may include a personalized image, such as, for example, a personalized avatar that includes text corresponding to text input by a user.

message video payload 408: video data, captured by a camera component or retrieved from a memory component of the client device 102, and that is included in the message 400. Video data for a sent or received message 400 may be stored in the video table 314. The video data may include content generated using a viewfinder ring flash.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
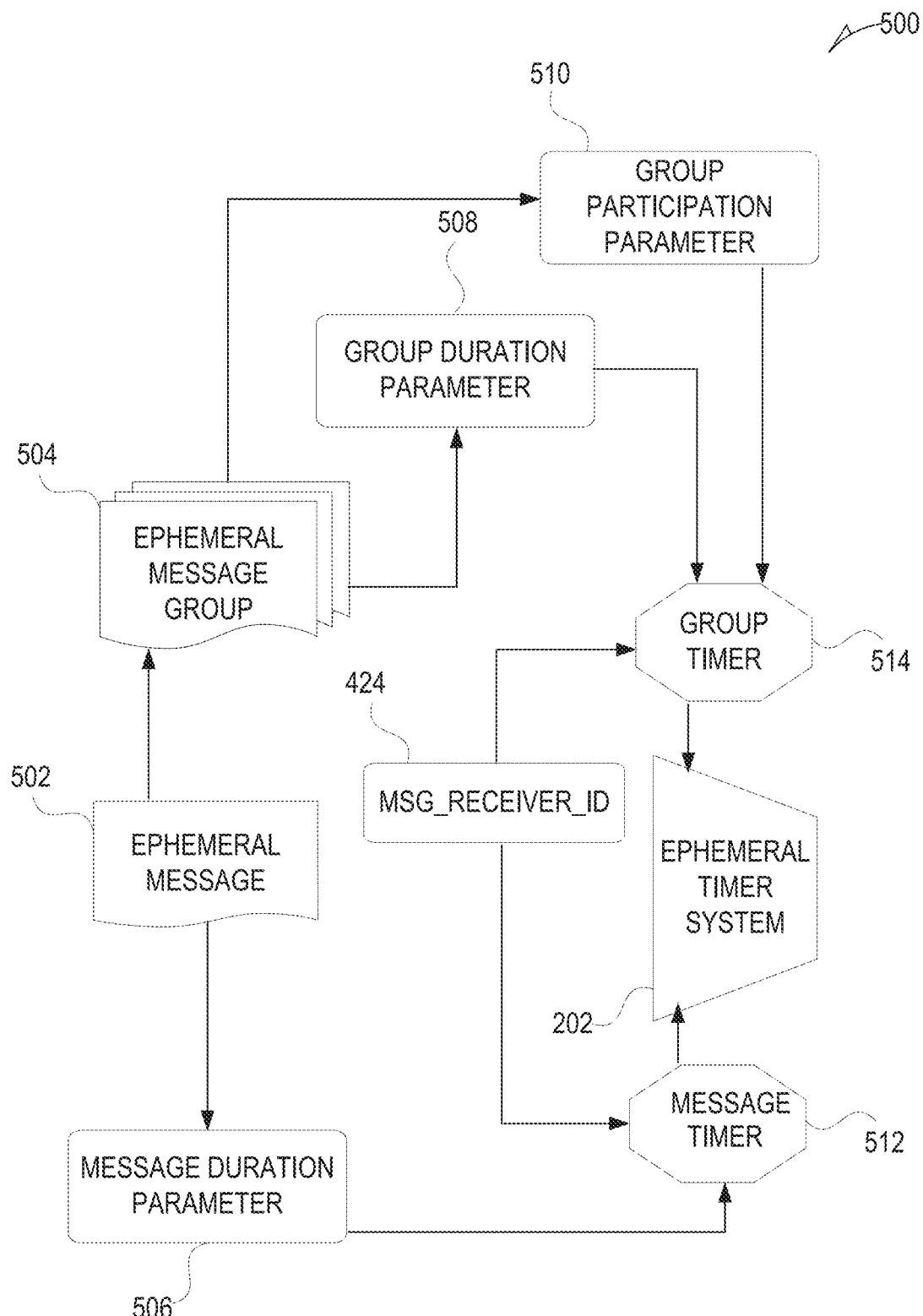
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using a viewfinder ring flash.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506. In some examples, the ephemeral message 502 may include a personalized image, such as, for example, a personalized avatar that includes text corresponding to text input by a user.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Process Flow and User Interfaces

Figure 6:
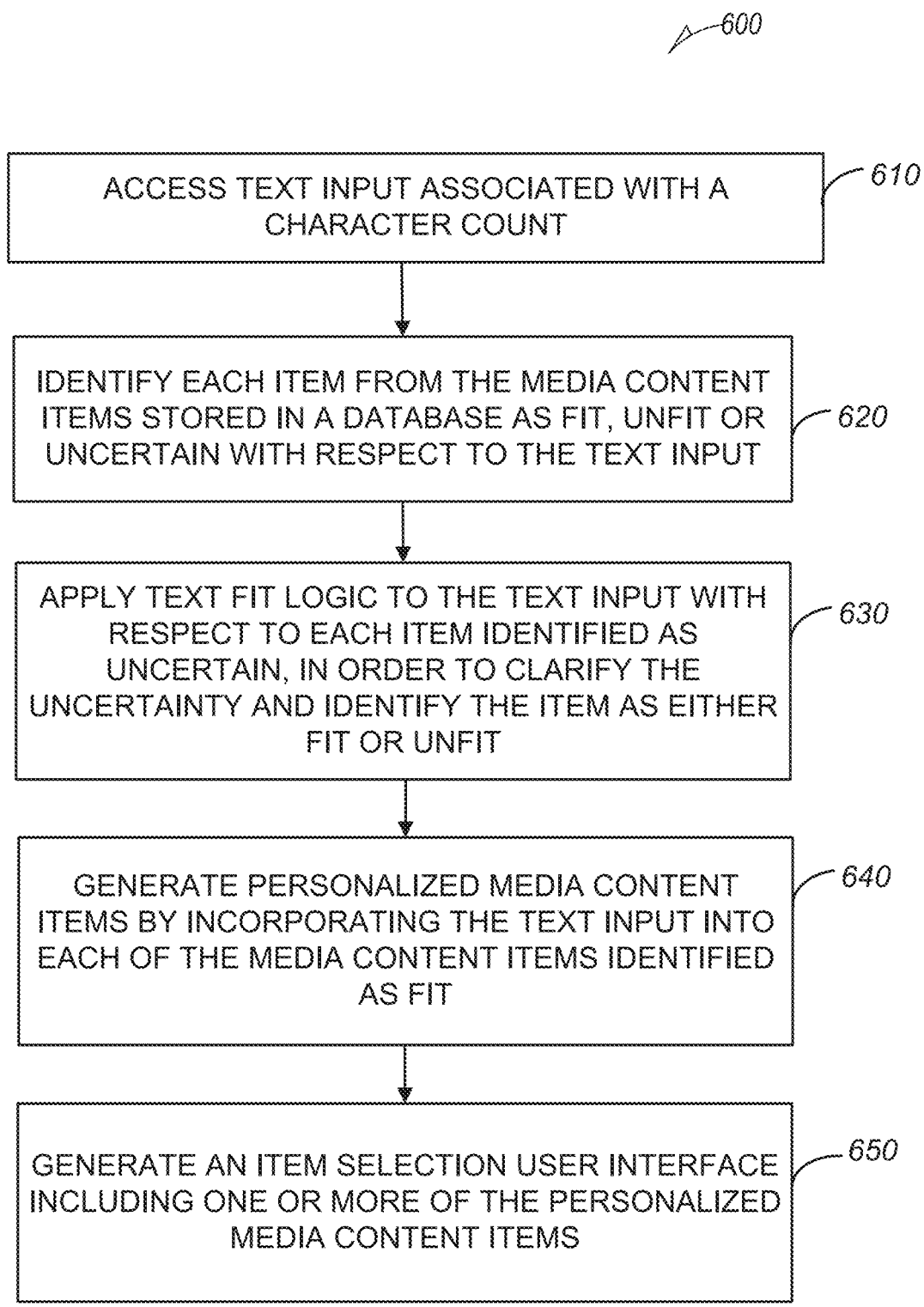
FIG. 6 illustrates a flowchart for a hybrid search process, in accordance with some examples.

FIG. 6 illustrates a flowchart for a hybrid search process 600, in accordance with some examples. While certain operations of the process 600 may be described as being performed by certain devices, in different examples, different devices or a combination of devices may perform these operations. For example, operations described below may be performed by the client device 102 or in combination with a server-side computing device (e.g., the message messaging server system 108), or a third-party server computing device.

The method commences, at operation 610, with accessing text input, which may be provided by a user. The text input is associated with a character count. Operation 620 comprises identifying, each item from the media content items stored in a database, as fit, unfit or uncertain with respect to the text input. Identifying a media content item as uncertain indicates that the item is suitable to fit the character count of a first size (the smallest size, for example) and not suitable to fit the character count of a second size (a larger size).

As explained above, each customizable media content item is associated with CCCs comprising a first condition, a second condition and a third condition. For a given media content item, the value of the first condition is the minimum threshold, the value of the second condition is the uncertain threshold (that indicates the maximum number of characters that can be presented as a line of text, if the line is completely filled with the largest character), and the value of the third condition is the maximum threshold (that indicates the maximum number of characters that can be included in a line of text, if the line is completely filled with the smallest character).

For example, suppose the text input is "HELLO," which has the character count 5. Also suppose a customizable media content item is associated with CCCs (1, 4, 7), which indicates that it can incorporate up to 7 small characters or text, such as, for example, "iiiiiii," but no more than 4 large characters, such that the text can't be larger than "WWWW." While the character count of "HELLO" is less than 7, it can't be determined with certainty that such input text can be incorporated in the customizable media content item without evaluating glyph characteristics of the individual characters in "HELLO."

As explained above, identifying a media content item as fit with respect to input text, by performing a rough search, comprises determining that the character count of the input text is greater than a value associated with the first condition and less than a value associated with the third condition. Identifying a media content items as unfit comprises determining that the character count of the input text is greater than a value associated with the third condition. Identifying a media content items as uncertain comprises determining that the character count of the input text is greater than a value associated with the second condition and less than a value associated with the third condition.

Operation 630 comprises applying text fit logic to the text input with respect to each media content item identified as uncertain, in order to clarify the uncertainty and identify the respective item as either fit or unfit. Applying the text fit logic comprises evaluating glyph characteristics of individual characters with respect to a customizable media content item.

As explained above, a customizable media content item may be suitable for incorporating one or more lines of text and can be stored as associated with a data structure, which includes the identifier for the avatar, a value indicating the number of lines of text that can be incorporated into the avatar (a line count), and respective CCCs associated with each line a set of line count text rendering conditions. Each member in the set of line count text rendering conditions comprises a first condition, a second condition and a third condition. In some examples, the input text is used to generate split options, where each option comprises the text input being split into one or more lines. A customizable media content item is identified as fit with respect to the text input if it is determined that it can incorporate at least one of the split options. A customizable media content item is identified as unfit with respect to the text input if it is determined that that it can incorporate none of the split options, based on the CCCs associated with the customizable media content item.

A customizable media content item is identified as uncertain with respect to the text input if it is determined, based on the CCCs associated with the customizable media content item, that (1) for none of the split options, the number of characters in each line is less than or equal to the value of the associated second condition from the CCCs (the maximum of the largest characters), and (2) for at least one of the split options the number of characters in each line is less than or equal to the value of the associated third condition (the maximum of the smallest characters). Determining that the number of characters in a line of text is less than or equal to the value of the associated second condition from the CCCs can be referred to as a match with respect to the second condition. Determining that the number of characters in a line of text is less than or equal to the value of the associated third condition from the CCCs can be referred to as a match with respect to the third condition.

A split option identified as uncertain with respect to the input text can be further analyzed by evaluating respective glyph characteristics of individual characters in the uncertain option with respect to the customizable media content item. Based on the result of the evaluating, the customizable media content item can be recharacterized as fit or unfit with respect to the uncertain option.

Returning to FIG. 6, operation 640 comprises generating personalized media content items by incorporating the text input into each of the media content items that have been identified as fit. In one example, a personalized media content item includes two image layers. The first image layer may include the text generated based on the input text that is overlaid over a predetermined position in the second image layer, and the second image layer may include an image stored in the associated customizable media content item. In some examples, in generating the personalized media content item, the system manipulates the text (for example, letter spacing, letter size, letter font, and so on). In another example, the system manipulates the characteristics of the customizable media content item (such as avatar orientation and alignment, rotation, media object placement, and so on) in order to integrate the text into the media content item.

Figure 7:
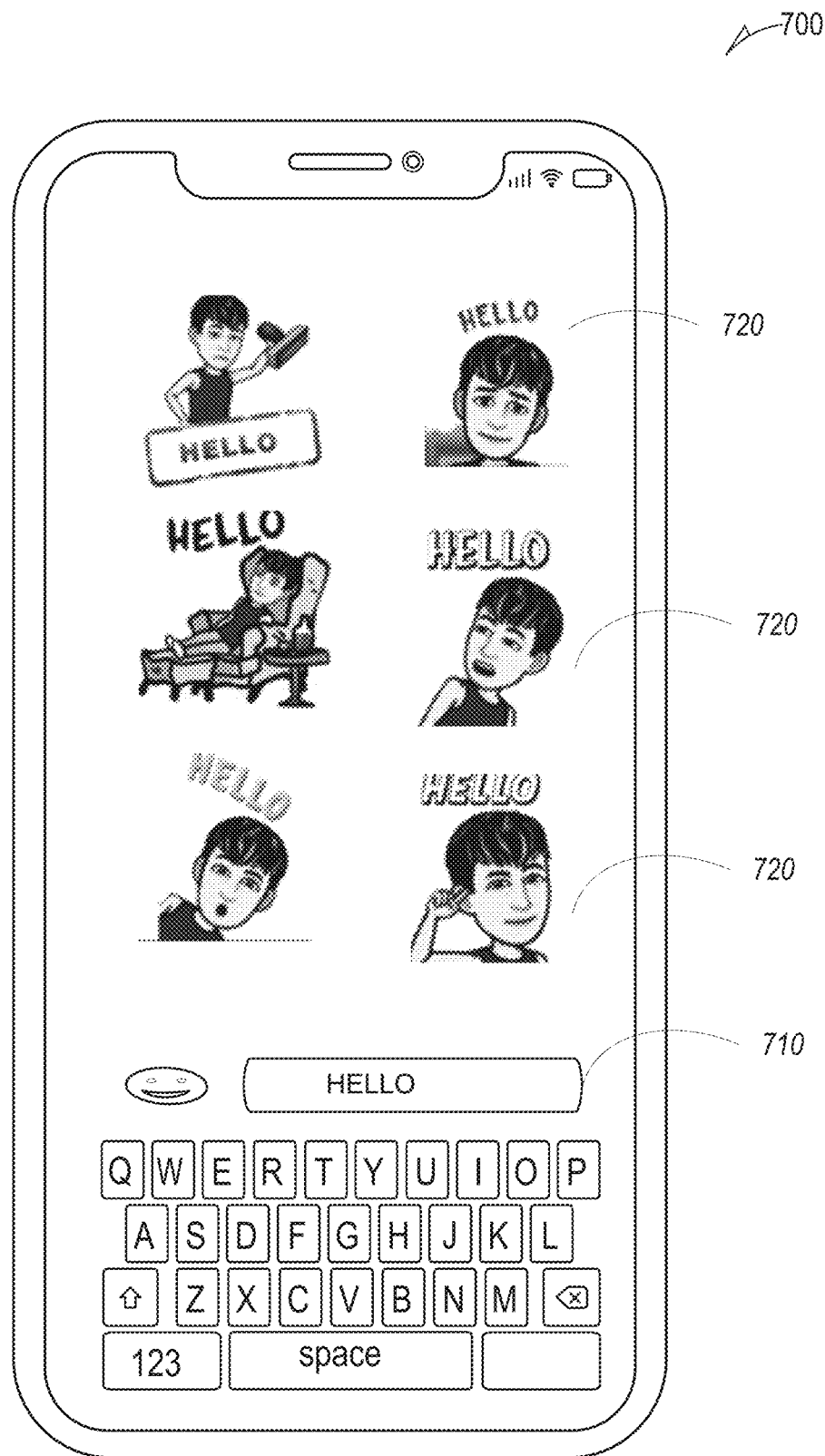
FIG. 7 is a diagrammatic representation of an item selection user interface in accordance with some examples.

Operation 650 comprises generating an item selection user interface that includes one or more of the personalized media content items. An example of an item selection user interface, included in diagrammatic representation 700, is shown in FIG. 7. FIG. 7 illustrates the text input "HELLO" in area 710 and presentations 720 of the personalized media content items, which are avatars in this example.

Figure 8:
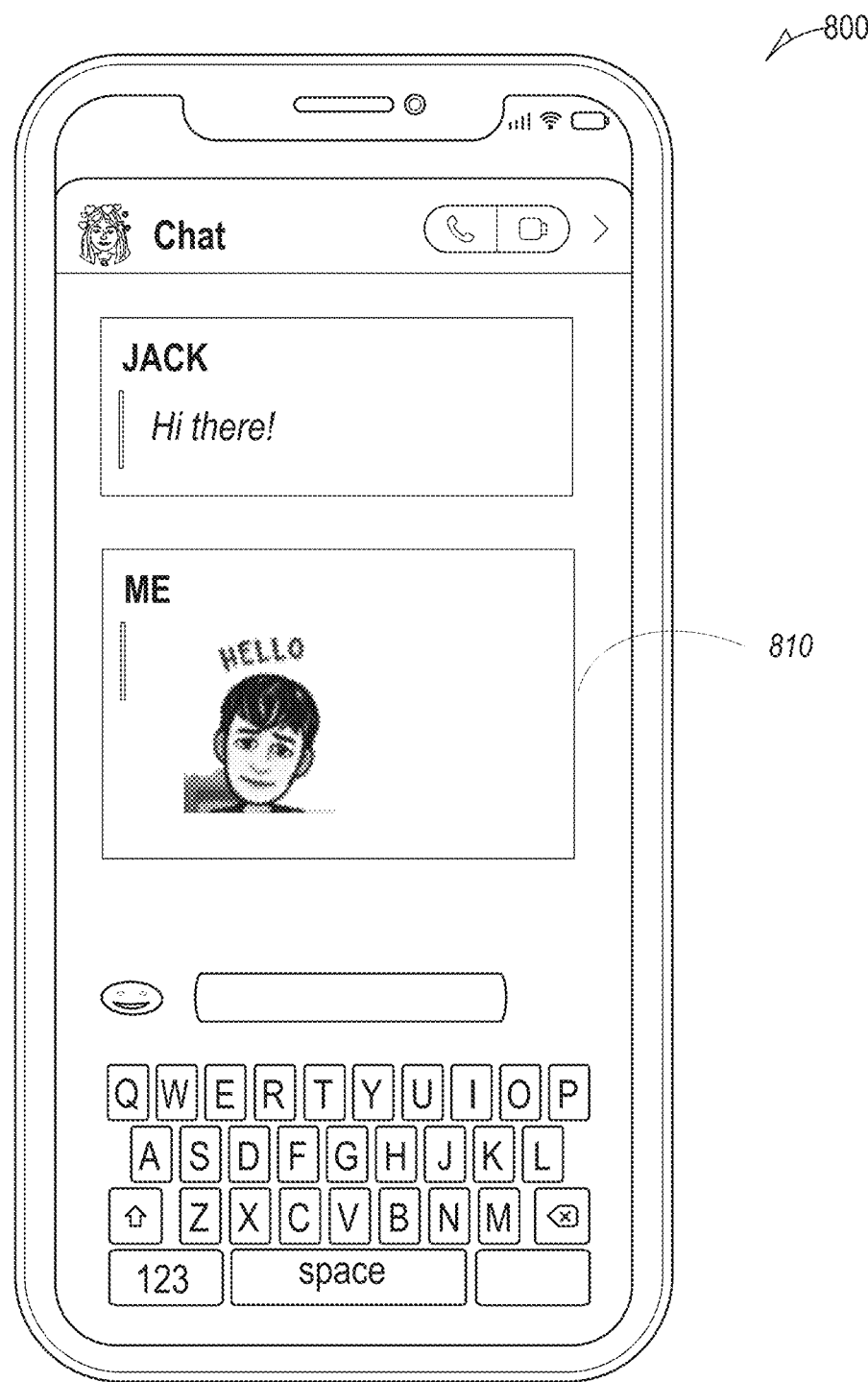
FIG. 8 is a diagrammatic representation of a context user interface that includes a personalized media content item, in accordance with some examples.
Figure 9:
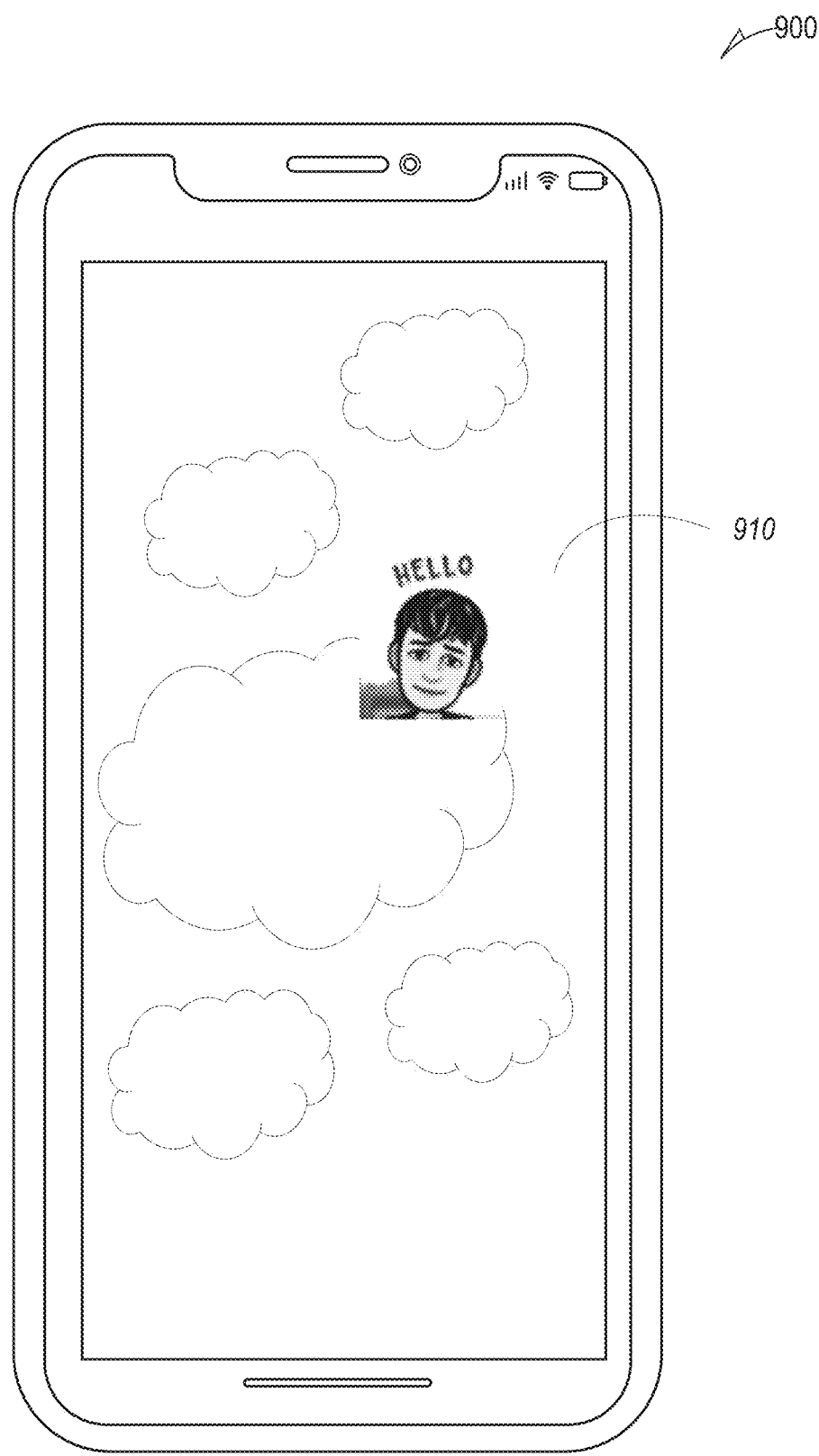
FIG. 9 is a diagrammatic representation of a further context user interface that includes a personalized media content item, in accordance with some examples.

After the item selection user interface is presented on a display device, and in response to receiving an indication of a selected item from the personalized media content items in the item selection user interface, the selected item is included in a context user interface. An example of a context user interface, included in diagrammatic representation 800, is shown in FIG. 8. FIG. 8 illustrates a chat messaging user interface, in which a personalized avatar incorporating the text input "HELLO" is included in area 810. Another example of a context user interface is shown in FIG. 9, as a diagrammatic representation 900, in which a personalized avatar incorporating the text input "HELLO" is included in an image editing user interface in area 910. Shown in the area 910 is an image of clouds (representing a previously captured photo, for example) with the personalized avatar incorporating the text input "HELLO" overlaid over the image of clouds.

Machine Architecture

Figure 10:
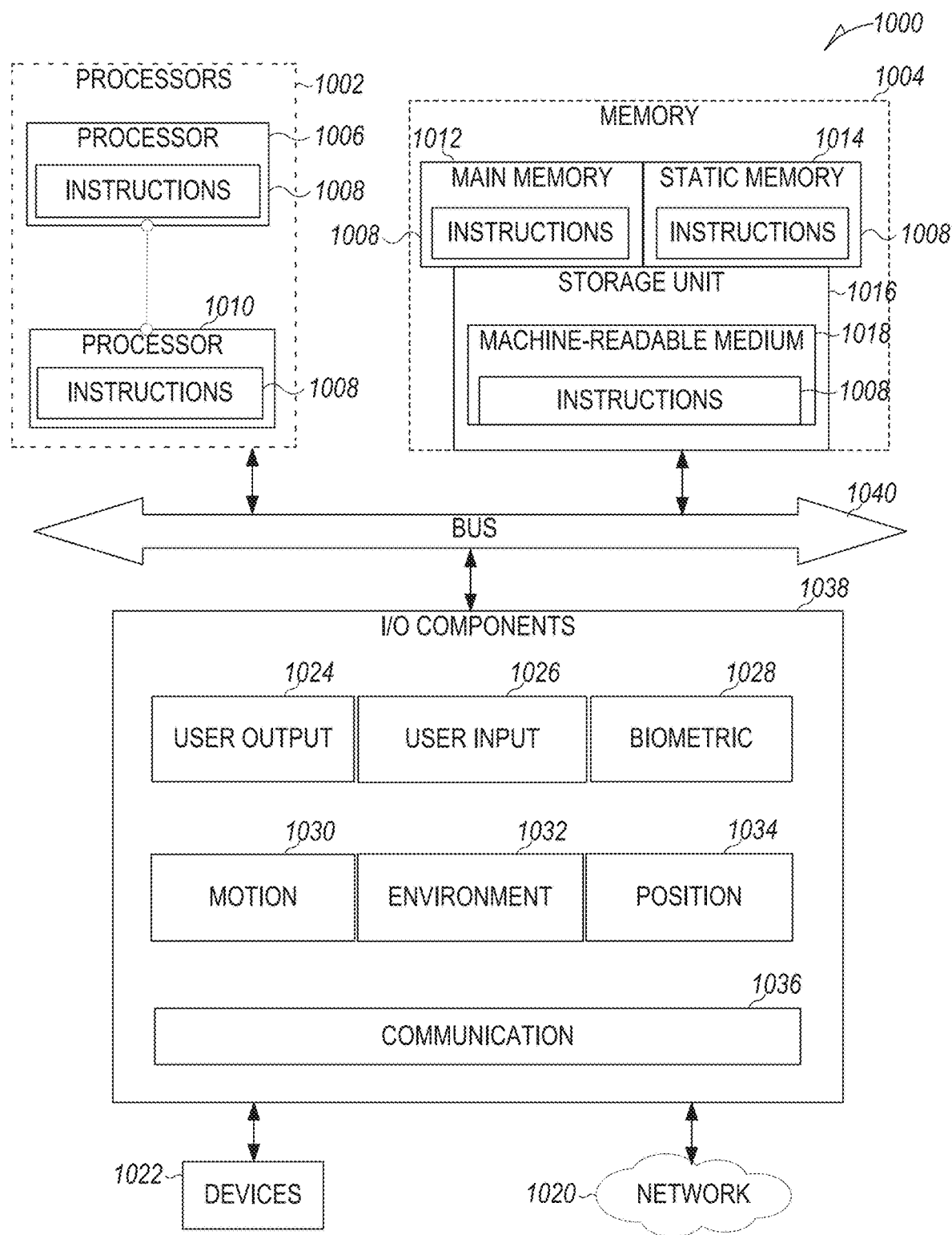
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output I/O components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front facing cameras on a front surface of the client device 102 and rear cameras on a rear surface of the client device 102. The front facing cameras may, for example, be used to capture still images and video of a user of the client device 102 (e.g., "selfies"), which may then be augmented with augmentation data (e.g., filters) described above. In the examples where the front facing camera is used with a viewfinder ring flash described herein, the user has the ability to use augmented reality face filters in low light conditions, even in complete darkness, as the viewfinder ring flash illuminates the user's face without obscuring the output of the digital image sensor. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF410, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
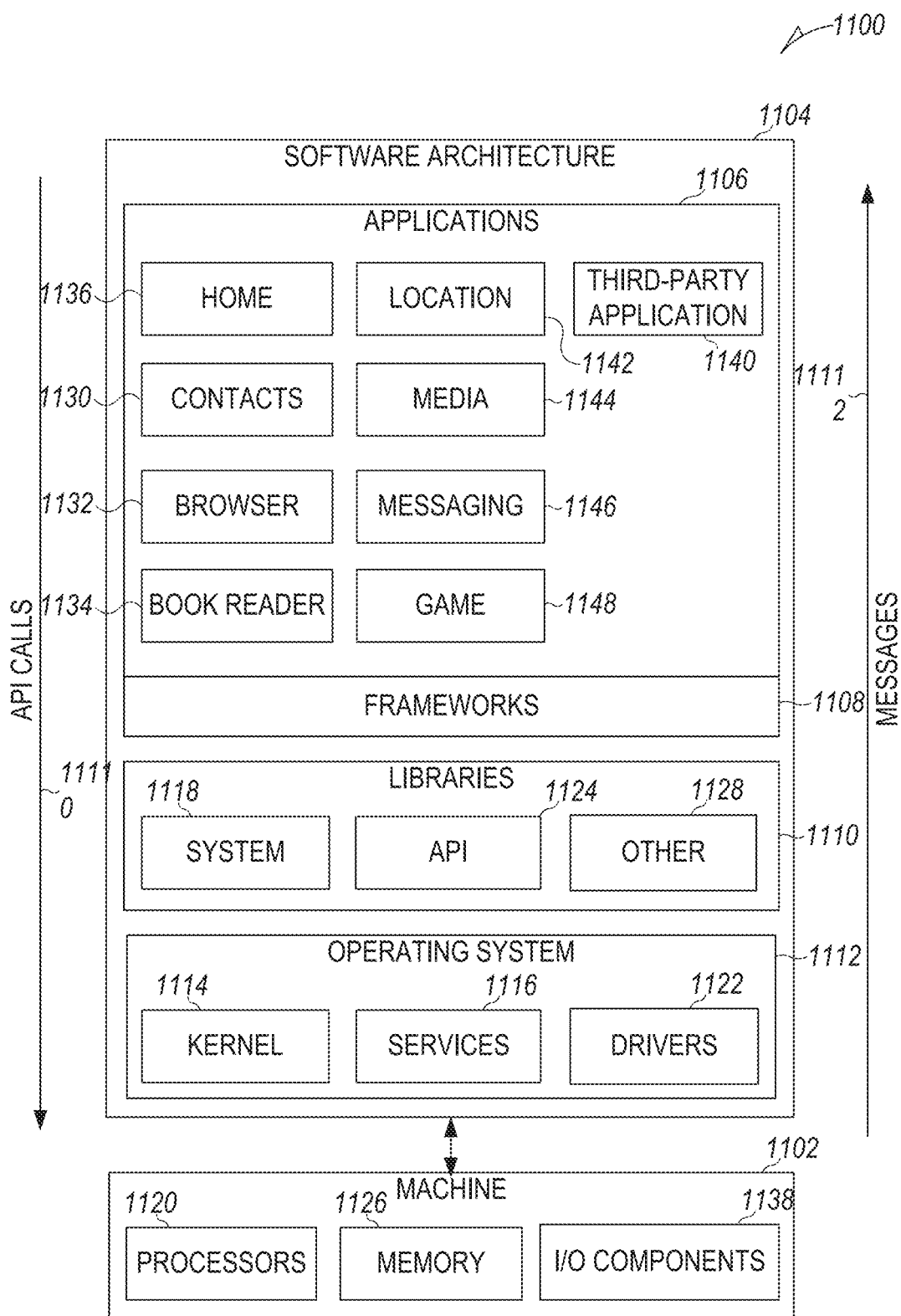
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 11110 through the software stack and receive messages 11112 in response to the API calls 11110.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 11110 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   storing media content items in a database;
   accessing text input associated with a character count;
   identifying each media content item from the media content items as one of fit, unfit or uncertain from a set of fit, unfit, or uncertain with respect to the text input, a media content item identified as uncertain indicating that the media content item is suitable to fit the character count of characters of a first size and not suitable to fit the character count of characters of a second size, at least one media content item being identified as uncertain, and one or more media content items being identified as fit;
   responsive to identifying the at least one media content item as uncertain, applying text fit logic to the text input with respect to each media content item identified as uncertain, to identify the media content item as either one of fit or unfit from the set of fit or unfit;
   responsive to identifying the one or more media content items as fit, generating personalized media content items by incorporating the text input into each of the one or more media content items identified as fit; and
   generating an item selection user interface, the item selection user interface including one or more media content items from the personalized media content items.

2. The method of claim 1, wherein:
   each media content item from the media content items is associated with a first condition, a second condition and a third condition; and
   identifying a first media content item from the media content items as fit comprises determining that the character count is greater than or equal to a value associated with the first condition and less than or equal to a value associated with the second condition.

3. The method of claim 2, wherein identifying a second media content item from the media content items as unfit comprises determining that the character count is greater than a value associated with the third condition.

4. The method of claim 2, wherein identifying a third media content item from the media content items as uncertain comprises determining that the character count is greater than a value associated with the second condition and less than a value associated with the third condition.

5. The method of claim 4, wherein the applying of the text fit logic comprises evaluating respective glyph characteristics of individual characters in the text input.

6. The method of claim 1, wherein each media content item from the media content items is suitable for incorporating one or more lines of text and is associated with a line count and a set of line count text rendering conditions, each member in the set of line count text rendering conditions comprising a first condition, a second condition and a third condition, the method comprising:
   generating a plurality of split options based on the text input, each option from the plurality of split options comprising the text input split into one or more lines; and
   identifying a first media content item from the media content items as fit in response to determining that, at least one from the plurality of split options is suitable for incorporation into the first media content item based on the set of line count text rendering conditions associated with the first media content item, wherein the one or more media content items identified as fit comprises the first media content item.

7. The method of claim 6, comprising identifying a second media content item from the media content items as unfit in response to determining that, none from the plurality of split options are suitable for incorporation into the second media content item based on the set of line count text rendering conditions associated with the second media content item.

8. The method of claim 6, comprising, with respect to a third media content item from the media content items:
   determining that none from the plurality of split options is a match with respect to the second condition from the set of line count text rendering conditions associated with the third media content item;
   determining that an uncertain option from the plurality of split options is a match with respect to the third condition, wherein the at least one media content item identified as uncertain comprises the third media content item;

evaluating respective glyph characteristics of individual characters in the uncertain option; and identifying the third media content item as fit with respect to the uncertain option, in response to a result of the evaluating.

9. The method of claim 1, comprising:

causing presentation of the item selection user interface on a display device;

receiving an indication of a selected media content item from the personalized media content items in the item selection user interface; and including the selected media content item in a context user interface.

10. The method of claim 9, wherein the context user interface is a chat messaging user interface or an image editing user interface.

11. A system comprising:

one or more processors; and a non-transitory computer readable storage medium comprising instructions that when executed by the one or more processors cause the one or more processors to perform operations comprising:

storing media content items in a database;

accessing text input associated with a character count;

identifying each media content item from the media content items as one of fit, unfit or uncertain from a set of fit, unfit, or uncertain with respect to the text input, a media content item identified as uncertain indicating that the media content item is suitable to fit the character count of characters of a first size and not suitable to fit the character count of characters of a second size;

responsive to identifying at least one media content item as uncertain, applying text fit logic to the text input with respect to each media content item identified as uncertain, to identify the media content item as either one of fit or unfit from the set of fit or unfit;

responsive to identifying one or more media content items as fit, generating personalized media content items by incorporating the text input into each of the one or more media content items identified as fit; and generating an item selection user interface, the item selection user interface including one or more media content items from the personalized media content items.

12. The system of claim 11, wherein:

each media content item from the media content items is associated with a first condition, a second condition and a third condition; and identifying a media content item from the media content items as fit comprises determining that the character count is greater than or equal to a value associated with the first condition and less than or equal to a value associated with the second condition.

13. The system of claim 12, wherein identifying a media content item from the media content items as unfit comprises determining that the character count is greater than a value associated with the third condition.

14. The system of claim 12, wherein identifying a media content item from the media content items as uncertain comprises determining that the character count is greater than a value associated with the second condition and less than a value associated with the third condition.

15. The system of claim 14, wherein the applying of the text fit logic comprises evaluating respective glyph characteristics of individual characters in the text input.

16. The system of claim 11, wherein each media content item from the media content items is suitable for incorporating one or more lines of text and is associated with a line count and a set of line count text rendering conditions, each member in the set of line count text rendering conditions comprising a first condition, a second condition and a third condition, the operations comprising:

generating a plurality of split options based on the text input, each option from the plurality of split options comprising the text input split into one or more lines; and identifying a first media content item from the media content items as fit in response to determining that, at least one from the plurality of split options is suitable for incorporation into the first media content item based on the set of line count text rendering conditions associated with the first media content item, wherein the one or more media content items identified as fit comprises the first media content item.

17. The system of claim 16, the operations comprising identifying a second media content item from the media content items as unfit in response to determining that, none from the plurality of split options are suitable for incorporation into the second media content item based on the set of line count text rendering conditions associated with the second media content item.

18. The system of claim 16, the operations comprising, with respect to a third media content item from the media content items:

determining that none from the plurality of split options is a match with respect to the second condition from the set of line count text rendering conditions associated with the third media content item;

determining that an uncertain option from the plurality of split options is a match with respect to the third condition, wherein the at least one media content item identified as uncertain comprises the third media content item;

evaluating respective glyph characteristics of individual characters in the uncertain option; and identifying the third media content item as fit with respect to the uncertain option, in response to a result of the evaluating.

19. The system of claim 11, the operations comprising:

causing presentation of the item selection user interface on a display device;

receiving an indication of a selected media content item from the personalized media content items in the item selection user interface; and including the selected media content item in a context user interface.

20. A machine-readable non-transitory storage medium having instruction data executable by a machine to cause the machine to perform operations comprising:

storing media content items in a database;

accessing text input associated with a character count;

identifying each item from the media content items as one of fit, unfit or uncertain from a set of fit, unfit, or uncertain with respect to the text input, an item identified as uncertain indicating that the item is suitable to fit the character count of characters of a first size and not suitable to fit the character count of characters of a second size;

responsive to identifying at least one media content item as uncertain, applying text fit logic to the text input with respect to each media content item identified as uncertain, to identify the media content item as either one of fit or unfit from the set of fit or unfit;

responsive to identifying one or more media content items as fit, generating personalized media content items by incorporating the text input into each of the one or more media content items identified as fit; and generating an item selection user interface, the item selection user interface including one or more media content items from the personalized media content items.

\* \* \* \* \*